United States Patent [19]

Rodgers

[11] Patent Number: 5,372,493

[45] Date of Patent: Dec. 13, 1994

[54] CONTINUOUS CASTING APPARATUS USING TWO MOVING BELTS

[76] Inventor: Gary C. Rodgers, 647 Laurentian Avenue, North Bay, Ontario, P1B 7T8, Canada

[21] Appl. No.: 62,924

[22] Filed: May 13, 1993

[51] Int. Cl.⁵ .................................. B29C 43/22
[52] U.S. Cl. ..................... 425/188; 425/193; 425/223; 425/224; 425/371; 425/378.1; 425/388; 100/151; 100/152
[58] Field of Search ............... 425/223, 224, 371, 372, 425/378.1, 388, 85, 193, 188, DIG. 60; 100/151, 152, 154, 153

[56] References Cited

U.S. PATENT DOCUMENTS

| | | | |
|---|---|---|---|
| 2,866,730 | 12/1958 | Potchen et al. | 154/100 |
| 3,193,888 | 7/1965 | Rochester | 425/371 |
| 3,376,371 | 4/1968 | Opel et al. | 264/216 |
| 3,422,178 | 1/1969 | Junker et al. | 264/216 |
| 3,487,143 | 12/1969 | Bergwall | 264/216 |
| 3,620,158 | 11/1971 | Torelli et al. | 100/154 |
| 3,622,393 | 11/1971 | Sherwood | 136/148 |
| 3,708,566 | 1/1973 | Junker et al. | 264/171 |
| 3,745,846 | 7/1973 | Birckhead | 425/223 |
| 3,764,247 | 10/1973 | Garrett et al. | 425/371 |
| 3,792,953 | 2/1974 | Ahrweiler | 425/371 |
| 3,904,336 | 9/1975 | Axer et al. | 425/371 |
| 4,004,870 | 1/1977 | Guttinger et al. | 425/224 |
| 4,008,024 | 2/1977 | Yokota et al. | 425/371 |
| 4,311,550 | 1/1982 | Kerttula | 425/371 |
| 4,334,468 | 6/1982 | Guttinger et al. | 100/93 RP |
| 4,406,850 | 9/1983 | Hills | 264/171 |
| 4,420,359 | 12/1983 | Goldsworthy | 100/151 |
| 4,541,889 | 9/1985 | Held | 156/583.5 |
| 4,714,015 | 12/1987 | Stabler | 100/154 |
| 4,826,560 | 5/1989 | Held | 156/498 |
| 4,839,125 | 6/1989 | Ida | 264/216 |
| 5,042,372 | 8/1991 | Bielfeldt et al. | 425/371 |
| 5,185,115 | 2/1993 | Thole | 425/371 |
| 5,244,618 | 5/1993 | Kemerer et al. | 425/371 |

Primary Examiner—Khanh Nguyen
Attorney, Agent, or Firm—David P. Gordon

[57] ABSTRACT

A apparatus for continuously casting a liquid thermoset resin or composition in which a liquid thermoset resin or composition is fed into a space defined between a pair of moving endless belts arranged such that the lower run of the upper belt is disposed above the upper run of the lower belt; the adjacent runs of the belts are moved concurrently with each other at substantially the same speed and a first fluid container is provided above the upper belt with its lower surface in contact with the lower run of the upper belt. A second fluid container is provided below the lower belt with its upper surface in contact with the upper run of the lower belt. The fluid in the first fluid container is maintained at a first desired temperature and the fluid in the second fluid container is maintained at a second desired temperature. The lower run of the upper belt is maintained in contact with the lower surface of the first fluid container whereby the lower run of the upper belt is held up without any substantial sag.

8 Claims, 3 Drawing Sheets

CONTINUOUS CASTING APPARATUS USING TWO MOVING BELTS

FIELD OF THE INVENTION

This invention relates to a process and apparatus for continuously casting a liquid thermoset resin or composition, such as a thermoset plastic, into a finished shape.

The term "resin" will be understood to mean a liquid polymer without any filler added to it. The term "composition" will be understood to mean a blend of liquid polymer and some type of filler anywhere from fibreglass to clays or any organic or inorganic material that could be added for whatever reason. The described process and apparatus may be used to produce either unfilled product made from resin or a product that is made from a composition of inorganic or organic filler(s) and resin.

The unsaturated cross-linking monomers used in the compositions of this invention are the compounds conventionally used for this purpose, for example, styrene; alpha-methyl styrene; 2,3-dimethyl styrene; 2,5-dimethyl styrene; 2,4-dimethyl styrene; alpha-chloro styrene; alpha-ethyl styrene; methyl propyl styrene; p-ethyl styrene; bromo-sytrene; dichloro-styrene; iso-propenyl toluene; vinyl naphthalenes; the o-, m- and p-chloro- and bromo-styrenes; esters of alpha-methylene carboxylic acids such as methyl acrylate; ethyl acrylate; n-butyl acrylate; iso-butyl acrylate; dodecyl acrylate; 2-chloro-ethyl acrylate; 2-propyl acrylate; 2,2'-dichloroisopropyl acrylate; phenyl acrylate; iso-hexyl acrylate; methylalpha-chloro-acrylate; methyl methacrylate; ethyl methacrylate; methyl ethacrylate; acrylonitrile; methacrylonitrile; vinyl esters such as vinyl acetate; vinyl propionate; vinyl butyrate; vinyl laurate; vinyl stearate and vinyl chloro-acetate; vinyl ethers such as vinyl methyl ether; vinyl isobutyl ether; vinyl 2-chloro ethyl ether and vinyl stearyl ether; vinyl ketones such as a vinyl methyl ketone; vinyl heptyl ketone and methyl isopropenyl ketone; olefins such as isobutylene; vinylidene halides such as vinylidene chloride and vinylidene fluoride; N-vinyl compounds such as N-vinylpyrrole; N-vinyl carbazole; N-vinyl indole and N-vinyl succinimide; acrylamide, ethacrylamide, N-methylolacrylamide; allyl compounds such as diallyl phthalate; allyl alcohol; allyl acetate; allyl methacrylate; diallyl carbonate; allyl lactate; diallyl malonate; diallyl gluconate; diallyl adipate; diallyl sebacate; diallyl-citraconate; the diallyl ester of muconic acid; diallyl itaconate; diallyl chlorophthalate; triallyl citrate; triallyl cyanurate; trallyl phosphate; trimethallyl phosphate and tetraallyl silicate.

BACKGROUND OF THE INVENTION

Previously proposed continuous cast systems used in resin systems that polymerize have a section of the former that introduces heat to the product, and a section of the former that carries out the post cure process. This generally makes for a long system that requires a large amount of critical control area. In U.S. Pat. No. 3,376,371 (issued Apr. 2, 1968-Opel et al) the apparatus is 50.3 meters long and in U.S. Pat. No. 4,046,850 (issued Sep. 6, 1977-Kato et al) the apparatus is 15 meters in length. Other systems that are shorter operate at such a slow speed that their commercial use in the production of this type of product is questionable. An example is U.S. Pat. No. 3,422,178 (issued Jan. 14, 1969-Junker et al) which has a length of 3.65 meters and referring to the examples cited in this patent it appears to produce the product at a rate of from 0.114 to 0.216 meters per minute. The longer system described in U.S. Pat. No. 4,046,850 gives examples of speeds of 0.217 to 0.624 meters per minute. The longest system described in U.S. Pat. No. 3,376,371 gives a belt speed of 0.914 meters per minute.

In the above-mentioned prior systems it will be seen that an appropriate length of time is required for the adequate transfer of heat from the heat source to the product being formed or produced to effect polymerization as desired. The methods used to achieve this have been either running a short system slowly or providing a longer more complicated system running at a faster speed. This increases the critical dimensions of the forming area of the system. Furthermore, the product being formed has to reach sufficient strength before it can tolerate the removal from the surfaces which define the product shape, due to the nature of the belts required for these systems and their poor natural release properties. This also dictates the speed and/or length of the belt forming section.

The use of the cavity formed between the metal belts, by whatever means, as a heat exchanger is believed to be an inefficient method when time is a factor. This inefficiency becomes magnified the thicker the cross-section of the part that is being formed. The cavity formed by the belts to define the product being formed is best suited for that purpose alone and deformity thereof should be avoided so far as possible. Efficient transfer of heat requires much greater areas of exposure of product to the heated surface.

SUMMARY OF THE INVENTION

According to one aspect of the present invention there is provided a process for continuously casting a liquid thermoset resin or composition which comprises the steps of feeding said liquid thermoset composition into a space defined between a pair of moving endless belts arranged such that the lower run of the upper belt is disposed above the upper run of the lower belt; causing the runs to move concurrently with each other at substantially the same speed; providing a first fluid container above said upper belt with its lower surface in contact with the lower run of said upper belt; providing a second fluid container below said lower belt with its upper surface in contact with the upper run of said lower belt; maintaining the fluid in said first fluid container at a first desired temperature; maintaining the fluid in said second fluid container at a second desired temperature; and maintaining the lower run of said upper belt in contact with the lower surface of said first fluid container.

According to another aspect of the invention there is provided an apparatus for continuously casting a liquid thermoset resin or composition which comprises a pair of moving endless belts defining a space therebetween for said liquid thermoset composition and arranged such that the lower run of the upper belt is disposed above the upper run of the lower belt; said runs, in use, being caused to move concurrently with each other at substantially the same speed; a first fluid container above said upper belt with its lower surface in contact with the lower run of said upper belt; a second fluid container below said lower belt with its upper surface in contact with the upper run of said lower belt; means for maintaining the fluid in said first fluid container at a desired temperature; means for maintaining the fluid in said second fluid container at a second desired temperature; and means for maintaining the lower run of said upper belt in contact with the lower surface of said first fluid container.

BRIEF DESCRIPTION OF THE DRAWINGS

Embodiments of the present invention will now be described, by way of example, with reference to the accompanying drawings, in which.

The same reference numerals are applied to like parts in all the figures.

DESCRIPTION OF THE PREFERRED EMBODIMENTS

Figure 1:
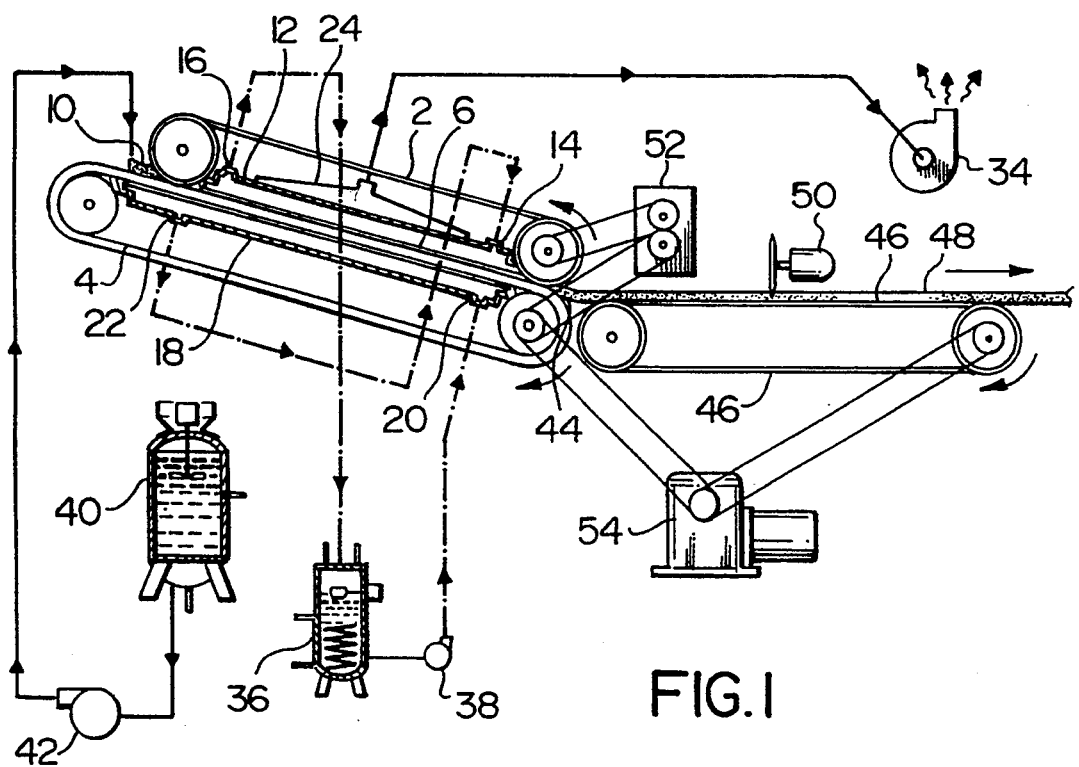
FIG. 1 is a diagrammatic representation of apparatus according to one embodiment of the present invention.

Referring to the figures, a pair of moving endless belts 2 and 4 defines a space 6 between them. The belts may, for example, be fabric belts. A dispenser unit 8 (FIG. 2) feeds a quantity of liquid thermoset resin or composition 10 at a controlled rate on to the upper run the lower belt 4 ahead of the space 6 between the two belts 2 and 4.

A platen unit 12 is provided above the lower run of the upper belt 2 and is constructed as a hollow vessel having a flat external surface towards the belt 2 and fluid inlet and outlet ports 14 and 16. A corresponding platen unit 18 is provided below the upper run of the lower belt 4 and is constructed as a hollow vessel having a flat external surface towards the belt 4 and fluid inlet and outlet ports 20 and 22.

Figure 2:
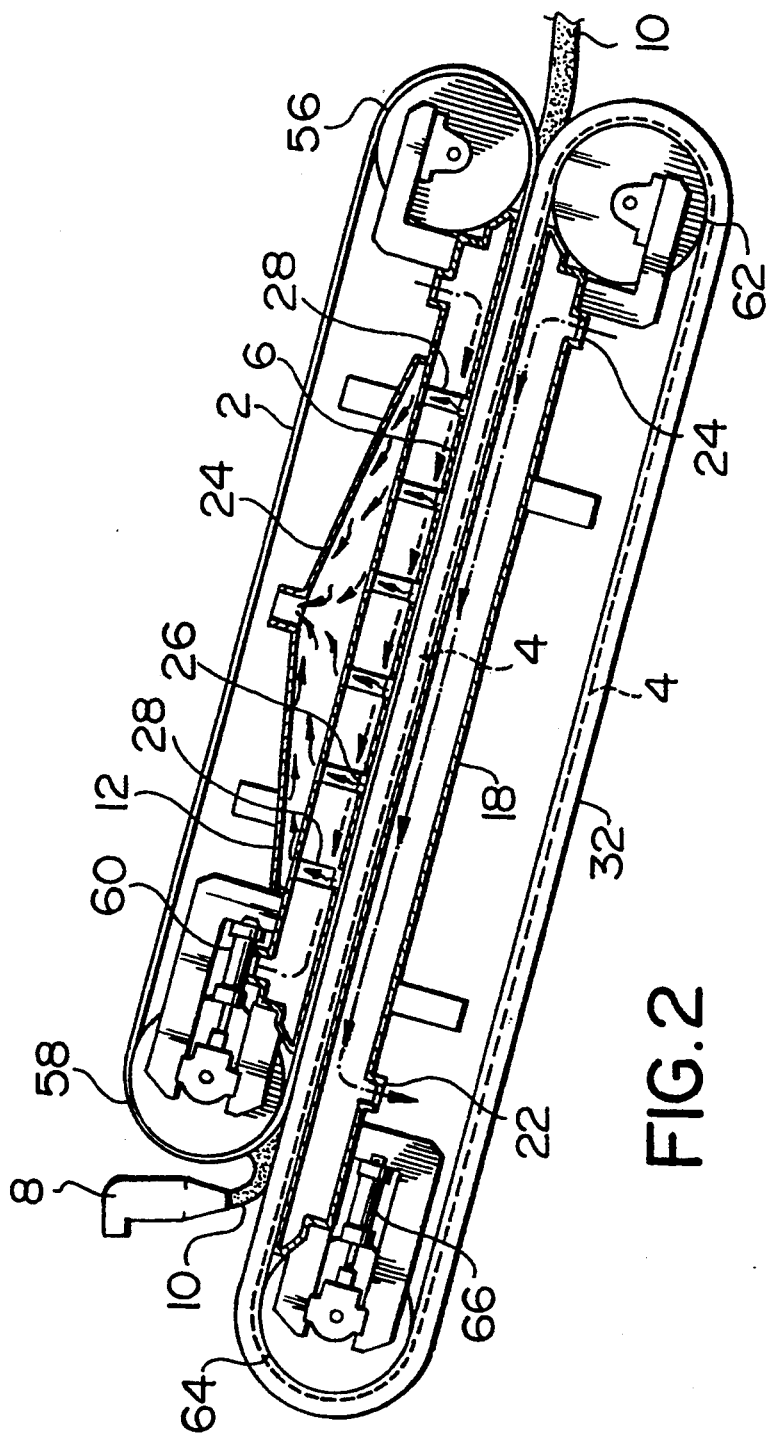
FIG. 2 shows part of the apparatus of FIG. 1 in greater detail.
Figure 3:
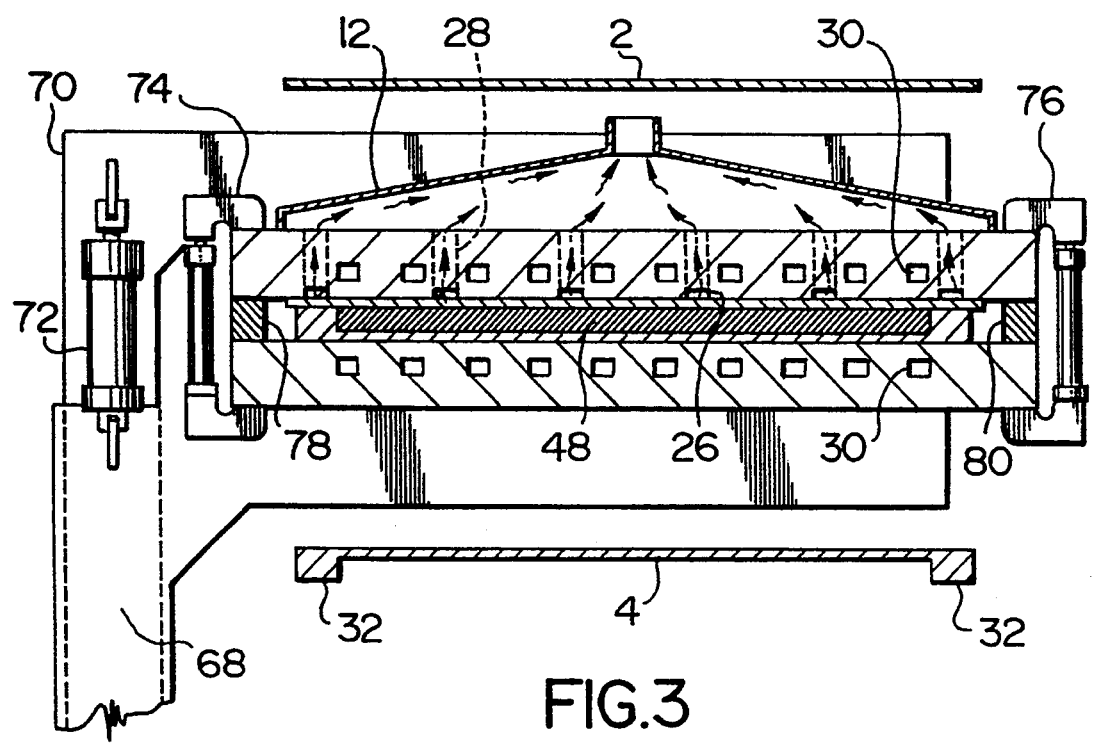
FIG. 3 is a cross-sectional view of part of the apparatus according to a second embodiment of the invention.

As can be seen more clearly in FIGS. 2 and 3 a vacuum plenum unit 24 is located above the platen unit 12 and is connected to grooves 26 in said flat external surface of platen unit 12 by way of pipes or tubes 28 passing through the platen unit 12. The grooves 26 may be herringbone or chevron-shaped and holes drilled through the platen 12 interconnect the tubes and the respective groove or grooves may be oriented in such a way as to pull wrinkles out to the edge of the belt.

The embodiment shown in FIG. 3 is similar to that in FIGS. 1 and 2 except the platen units 12 and 18 are not constructed as large tanks or containers for water, or other heating fluid, but are constructed from two layers of aluminum plate for the platen with channels 30 within the metal to form a cavity for the water to circulate therein. The channels 30 are formed by grooving out one of the plates, the plates being welded along their edges. However, distortion may be difficult to avoid so, alternatively, an O-ring seal could be used all around the perimeter with clamping bolts for the plates.

The lower belt 4 is constructed with integral side dams 32. These may be polyurethane preformed rectangular strips bonded to part of the belt 4 and they act as guide strips which help to define the width and height of the product which is normally a formed sheet. They travel around with belt 4. Alternatively, the strips could be fed in separately instead of being bonded to the belt.

In FIG. 1 a partial vacuum/exhauster unit 34 is provided to maintain the vacuum or suction pressure on the lower run of the upper belt 2 to hold it in contact with the platen unit 12 and prevent sag of the belt. A hot water tank 36 with an associated circulation pump 38 circulates heated water through platen container units 12 and 18 to create a temperature which is substantially equal to the temperature of the pre-heated composition 10 as it enters the space between the belts. Thus very little heat is lost into the platen.

As shown in FIG. 1, the belts 2 and 4 are inclined at an angle of about 15 degrees to the horizontal and the resin composition is held in a batch mixing holding tank unit 40 and is fed to the dispenser unit 8 by a metering pump unit 42 which measures the resin composition and the catalyst for adding later.

After emerging from between the upper and lower belts 2 and 4 at the point of egress 44, the product 10 travels along a horizontal moving endless conveyer belt 46 having been transformed into a formed sheet 48.

A saw unit 50 is provided above the belt 46 to cut the formed sheet 48 into desired lengths.

The power for driving the upper and lower belts 2 and 4 is obtained from a synchronous drive unit 52. A further synchronous drive unit 54 is also provided for the lower belt 4 and for the horizontal conveyor belt 46.

In FIG. 2, a head pulley 56 and a tail pulley 58 for the upper belt 2 are shown in greater detail. A belt tensioner unit 60 is provided in association with the tail pulley 58. A corresponding head pulley 62 and tail pulley 64 with a tensioner unit 66 are provided for the lower belt 4.

The saw unit 50 includes a highly polished chrome steel rod or tube on which one side of a saw bridge is supported and along which it can travel. The saw is mounted on a traverse threaded screw mechanism and a hydraulic drive motor is provided for the saw. In its rest position the saw is raised up and adjustable feet are provided to permit selection of an appropriate cutting depth dependent on the thickness of the formed sheet 48. The saw or slitter is subject to friction advancement along with sheet 48 as the slitter moves transversely of the sheet.

A cantilever arrangement is provided for the upper platen unit 12 and, referring to FIG. 3 it will be seen to include a lower support member 68, an upper support member 70 with an intermediate lift cylinder 72. Gauge clamps 74 and 76 are also shown in FIG. 3 as well as gauge blocks 78 and 80. The cantilever arrangement facilitates removal and/or replacement of the belts and in the raised position the upper platen unit 12 is held in position by means of a hook arrangement. To change a belt associated cylinders are retracted, the belt then becomes loose and can be slid off. A different size can be put on if one wants to change the dimensions—for example, to produce a wider or a thinner product.

In operation, the process is started by the loading of the batch mixing tank unit 40 with up to 1125 kgs of resin, and adding tinters as per batching instructions. Tinter and resin are blended together while a vacuum is drawn on the mixing tank 40. ATH filler is metered into the tank through a flush ball valve mounted on the bottom of the tank directed into the mixing head or blades. 1000 kg bags of filler are hung from a frame mounted on digital read-out scales to monitor flow rate and shut-off point. Vacuum should be minimum of 20" and preferred to be 25". Feed rate of the filler should be 20–25 kgs/minute. After all filler is loaded, vacuum should climb to 27" and mixing continue for 20–30 minutes. Temperature should be monitored at this stage. 120 to 125 degrees F. is expected.

The mix at this point will have a viscosity of 14–16000 cps. A metering pump in the tank unit 40 will draw the matrix from the bottom of the tank and pump it through a hot water heat exchanger which will further raise the temperature to 150-160 degrees F. Probes will be installed at several points on the material section of the exchanger to monitor the correct heat gradient gain. A controller will vary the flow rate of the water as required to meet predetermined values. The matrix will be circulated back into the batch tank 40 until the discharge temperature is seen to be stable at required values. At this point, the discharge from the exchanger will be connected to a static mixer. Catalyst line will be connected and production line can start.

Graphs and flow charts will have been produced giving the resin and catalyst start set points as expected to be required depending on size of sheet being produced. The pump has infinitely and independently variable stroke lengths as well as an infinitely variable drive speed. Stroke lengths will be adjusted manually. Drive speed of the pistons are inter-connected with controls regulating the variable drive speed of the forming section. A slowing up or an increase in speed of the forming belts will automatically adjust the flow of matrix by making the required speed changes to the pump.

Viscosity of the matrix is now about 7-8000 cps and flows quite freely. This ensures a good fill of the inclined cavity being filled. Due to the raised temperature and resin design, gelation begins in 50-55 seconds after catalyzation. At 60-65 seconds, the shape of the matrix is permanent. The discharge of the static mixer must be within a few feet of the former opening. Producing ⅜" production will mean 3.5-4 seconds of production in the static mixer. Another 3 seconds will be used up in the line from the end of the static mixer to the actual desired discharge point at the feed end of the former. Both forming platens are temperature controlled to ensure that there will not be any heat loss from the heated matrix. This ensures a more uniform cure through the cross section of the matrix and a more predictable gel time through the duration of the production run.

At the design speed of 6' per minute, the matrix will be dimensional formed and stable in the first 5' of the forming section. By the two minute mark, and point of discharge, the material is quite flexible but dimensionally stable and permanent. It also releases very readily from the Teflon covered forming belts or other self-lubricating surfaces. Although the belts in the forming section are moving, they are motionless relative to each other and the product being cast within the cavity defined by the belts. Basically, we have one continuously moving mold that comes together at one end to define the shape and opens at the other end to release the product.

As the product exits the forming section, a 15 degree flexing is required for the product to be taken on the horizontal conveyor 46 (FIG. 1). This section includes the cut-off saw or slitter 50. The consistency of the product at this point is somewhat like cheddar cheese with a little more flexural and body strength. Depending on the actual physical properties of the product being produced, a circular slitting blade will cut cleanly without any "saw dust". If required, a very thin, fine toothed or abrasive blade could be installed. The product is quite free from any stickiness at this point.

As the product moves along, it activates a sensor located at a point that will start the slitter unit 50, cutting the product to specified length. After the slitter has made its cut, a roller rotating above will lower and accelerate the product giving it sufficient velocity to load it onto the loading tilt table of the curing section.

Catalyzation produces an exothermic heat gain. Enclosing the production and curing sections will utilize the heat to maintain a controlled temperature environment. Heat in the curing section should be held around 180 degrees F. The air in this area will stratify, allowing the product to cool as it reaches the lower curing section levels. Supplementary heat will be required to bring the environment temperature up on production line start up. Exotherm can raise the temperature of the product to 250 degrees F. and will probably be able to supply most or all of the heat after start up. If required, cooling may be added to lower levels of the curing section.

As described above, pre-heating takes place in a separately designed heat exchanger to heat the product prior to introduction into the forming cavity. The advantages of this appear to be that the heated product has lower viscosity and will flow and fill the cavity better. Since heating of the product has already been carried out, it is ready to polymerize as soon as it is shaped in the cavity thus permitting a shorter overall length of the system; introduction of the catalyst at the point of discharge into the forming cavity will produce a substantially stress free product in cross-section since the temperature of the product is uniform throughout the resinous mixture. In the above-mentioned prior art systems, the resinous mixture is pre-catalyzed and heated in the forming section. The product in contact with the heated surfaces will begin polymerization first, the process and the related shrinkage not being consistent and even through the cross-section. The greater the cross-section dimension, the greater the problem which may arise.

A further advantage of the instant described system appears to be that the design of the heating for the forming section area can be simplified to maintain a process temperature rather than provide the process temperature.

In some prior systems the length of time for the product to attain a desired temperature can result in fillers of greater specific gravity settling out of the resin. The instant described system reduces this problem due to the continual movement of the product through the heat exchanger and equipment blending the catalyst into the resinous system which keeps the particles in suspension. Also, the heated product is ready to polymerize as soon as the catalyst is introduced providing a gelating of the resinous mixture in less than 1 meter into the forming section and thus allowing less time for any separating of the particles from the resin. It will be appreciated that the heated less viscous mixture can provide the advantage of higher filler loading and better wetting out of the particles in the product providing a better bond between the particles and resin.

In the system described with reference to FIGS. 1, 2 and 3 a forming length of 3 meters has been demonstrated at belt speeds from 1 to 2.4 meters per minute.

In the above description the liquid thermoset resin composition 10 is fed directly on to the lower belt 4 to provide the formed sheet 48. The described apparatus is equally applicable for use in applying a resin coating or a resin composition to a pre-formed rigid or semi-rigid board. This would be placed on the lower belt 4 before the application of the liquid composition 10 (FIG. 2) and would then travel between the two belts 2 and 4 where the liquid will bond to the board and a more uniform thickness can normally be obtained when compared to one previous system where sanding machines have to be used to produce a uniform thickness after forming a second composition sheet separately and bonding it to the board. The belts 2 and 4 in FIG. 1 would, of course, be more horizontal and in-line with the belt 46.

The product will be produced continuously and tachometers are used throughout to sense the drive speed and will, for example, supply the composition to the former section whereby when one gets the required flow speed that is working well at that speed, it will be "locked in". If the product is a little too soft an adjustment can be made to slow that section down and allow a little more curing time. The dispensing will automatically adjust. Also, to speed up production an adjustment can be made. The plates give shape definition for the product and not the belts. Previously, sagging of the lower run of the upper belt diminished or distorted the size of the cavity between the belts.

In FIG. 1 the water in platen units 12 and 18 is maintained at approximately the same temperature by a common hot water tank 36. However, if different temperatures are required then the platen units 12 and 18 can be connected to separate hot water tanks and not interconnected. It will also be understood that a cooling fluid could, alternatively, be used if desired.

The continuous cast system according to one constructed embodiment was designed for continuous product production from pre-mixed liquid state to individual sheets including:

1. infinitely adjustable production rate with self regulating product dispensing rate;
2. automatic sheet cutting to length on the fly;
3. automatic self regulating material handling from sheet cutting, through curing station, and onto skids at curing station discharge point;
4. sheet width and sheet thickness changed with expected down time of 15 to 20 minutes;
5. sheet length adjustable to 12, 10, and 8 foot lengths from main control console selector switch;
6. production rate of 12.5 to 18 sq. ft. per minute, depending on product width;
7. three standard thicknesses;
8. produce solid colours, "granite" look, and easily adaptable to "marble" look product;
9. machine easily modified to produce custom lengths other than industry standards;
10. adaptable for custom widths and thickness;
11. production line operated by one operator and one material handling;
12. PLC control;
13. close dimensional tolerances; and
14. manufactured to "hazardous locations" standards.

It will be readily apparent to a person skilled in the art that a number of variations and modifications can be made without departing from the true spirit of the invention which will now be pointed out in the appended claims.

I claim:

1. Apparatus for continuously casting a liquid thermoset resin or composition to produce a formed sheet which comprises:
   (i) an upper moving endless belt and a lower moving endless belt defining a space therebetween for said liquid thermoset resin or composition and each belt having and a lower run arranged such that the lower run of the upper belt is disposed above the upper run of the lower belt;
   (ii) said runs, in use, being caused to move concurrently with each other at substantially the same speed;
   (iii) a first fluid container having a lower surface above said lower run of said upper belt with its lower surface constituting a platen in contact with the lower run of said upper belt, said first fluid container having an inlet and an outlet port;
   (iv) a second fluid container having an upper surface below said upper run of said lower belt with its upper surface constituting a platen in contact with the upper run of said lower belt, said second fluid container having an inlet and an outlet port;
   (v) a hot liquid tank to supply pre-heated liquid to the inlet port of one of said fluid containers and receive return liquid from the outlet port of the other of said fluid containers, the outlet port of said one fluid container being connected to the inlet port of said other fluid container;
   (vi) grooves formed in the external surface of the platen of said first fluid container towards said lower run of said upper belt; and
   (vii) a vacuum plenum unit connected to each of said grooves to maintain a partial vacuum or suction pressure in said grooves to hold up said lower run of said upper belt without any substantial sag.

2. Apparatus according to claim 1 wherein said vacuum plenum unit is located above said first fluid container and is connected to said grooves by tubular members passing through said first fluid container.

3. Apparatus according to claim 1 wherein said first and second containers each comprise two layers of metal plate connected together with fluid channels therewithin.

4. Apparatus according to claim 1 wherein integral side dams are provided on said lower belt to define the width and height of said formed sheet.

5. Apparatus according to claim 1 including a cantilever arrangement for the upper belt to permit tilting along its length and facilitate removal and/or replacement of the belts.

6. Apparatus according to claim 1 wherein said pair of endless belts is at an acute angle to the horizontal and including a further moving endless belt for receiving the sheet exiting from said space on its upper run.

7. Apparatus according to claim 6 wherein said acute angle is approximately 15 degrees.

8. Apparatus according to claim 6 including a saw unit above the upper run of said further endless belt to cut said formed sheet.

* * * * *